(12) United States Patent
Strickroth (10) Patent No.: US 9,375,681 B2
(45) Date of Patent: Jun. 28, 2016

(54) PROCESS FOR THE CATALYTIC REMOVAL OF CARBON DIOXIDE, $NO_x$ FROM EXHAUST GASES

(71) Applicant: CPPE CARBON PROCESS & PLANT ENGINEERING S.A., Luxembourg-Dommeldange (LU)

(72) Inventor: Alain Strickroth, Esch/Alzette (LU)

(73) Assignee: CPPE CARBON PROCESS & PLANT ENGINEERING S.A., Luxembourg-Dommeldange (LU)

( * ) Notice: Subject to any disclaimer, the term of this patent is extended or adjusted under 35 U.S.C. 154(b) by 0 days.

(21) Appl. No.: 14/357,498

(22) PCT Filed: Nov. 9, 2012

(86) PCT No.: PCT/EP2012/072286
§ 371 (c)(1),
(2) Date: May 9, 2014

(87) PCT Pub. No.: WO2013/072257
PCT Pub. Date: May 23, 2013

(65) Prior Publication Data
US 2014/0314647 A1 Oct. 23, 2014

(30) Foreign Application Priority Data
Nov. 14, 2011 (LU) .......................... 91 900

(51) Int. Cl.
| | | |
|---|---|---|
| *B01D 53/86* | (2006.01) | |
| *B01J 21/18* | (2006.01) | |
| *B01J 37/10* | (2006.01) | |
| *B01J 38/48* | (2006.01) | |
| *B01J 38/64* | (2006.01) | |
| *B01J 35/00* | (2006.01) | |
| *B01J 35/02* | (2006.01) | |
| *B01J 35/10* | (2006.01) | |
| *B01J 37/00* | (2006.01) | |

(52) U.S. Cl.
CPC ........ *B01D 53/8671* (2013.01); *B01D 53/8628* (2013.01); *B01D 53/8646* (2013.01); *B01J 21/18* (2013.01); *B01J 35/0026* (2013.01);
(Continued)

(58) Field of Classification Search
None
See application file for complete search history.

(56) References Cited

U.S. PATENT DOCUMENTS 3,960,507 A * 6/1976 Tsujikawa et al. ............ 422/172
4,031,185 A * 6/1977 Akimoto et al. ........... 423/239.1
(Continued)

FOREIGN PATENT DOCUMENTS

CN 101564640 A 10/2009
CN 102031171 * 4/2011
(Continued)

*Primary Examiner* — Melvin C Mayes
*Assistant Examiner* — Sheng H Davis
(74) *Attorney, Agent, or Firm* — Nath, Goldberg & Meyer; Tanya E. Harkins (57) ABSTRACT

The present invention relates to a method for the catalytic removal of carbon dioxide and $NO_x$ from waste gases in a reactor charged with activated carbon catalyst. The method comprises the following steps:
  a. saturating the catalyst with water
  b. saturating or partially saturating the waste gases with water,
  c. introducing the waste gases into the reactor,
  d. catalytically converting NOx into $NO_2^-$ and, in parallel with this, catalytically converting $CO_2$ into carbon and $O_2$ on the same catalyst,
  e. washing out the activated carbon catalyst with water and discharging the carbon as a solid and $NO_2^-$ dissolved in water or in the base.

11 Claims, 12 Drawing Sheets

(52) U.S. Cl.
CPC ............ *B01J35/023* (2013.01); *B01J 35/1023* (2013.01); *B01J 37/0009* (2013.01); *B01J 37/10* (2013.01); *B01J 38/48* (2013.01); *B01J 38/64* (2013.01); *B01D 2253/102* (2013.01); *B01D 2255/702* (2013.01); *B01D 2257/404* (2013.01); *B01D 2257/504* (2013.01); *B01D 2258/0283* (2013.01); *Y02C 10/04* (2013.01)

(56) References Cited

U.S. PATENT DOCUMENTS

| | | | |
|---|---|---|---|
| 4,737,164 A * | 4/1988 | Sarkkinen | 95/68 |
| 5,439,508 A * | 8/1995 | Mayer-Schwinning et al. | 95/58 |
| 6,103,205 A * | 8/2000 | Wojtowicz et al. | 423/210 |
| 6,224,839 B1 * | 5/2001 | Fan et al. | 423/239.1 |
| 6,814,948 B1 | 11/2004 | Yasutake et al. | |
| 6,843,831 B2 * | 1/2005 | van de Kleut et al. | 95/134 |
| 2008/0254972 A1 * | 10/2008 | Istvan et al. | 502/182 |
| 2010/0083697 A1 * | 4/2010 | Degenstein et al. | 62/636 |

FOREIGN PATENT DOCUMENTS

| | | |
|---|---|---|
| JP | 4-63115 A | 2/1992 |
| JP | 11-347354 A | 12/1999 |
| JP | 2001162175 A | 6/2001 |
| KR | 10-2005-0028624 B1 | 3/2005 |
| WO | 2004/098740 A2 | 11/2004 |
| WO | 2005/108297 A2 | 11/2005 |
| WO | 2010/036668 A1 | 4/2010 |
| WO | 2011/138425 A1 | 11/2011 |

* cited by examiner

PROCESS FOR THE CATALYTIC REMOVAL OF CARBON DIOXIDE, $NO_x$ FROM EXHAUST GASES

This application is a 371 of PCT/EP2012/072286 filed Nov. 9, 2012 and also claims priority to foreign Patent Application: LU91900.

TECHNICAL FIELD

The present invention relates generally to a method for the catalytic removal of carbon dioxide and $NO_x$ from waste gases.

PRIOR ART

Discussions on climate change have clearly demonstrated to mankind that the resources available to us are limited and that the harmful substances produced by human activities have a major impact on the environment and lead to long-term climate change. After sulfur emissions took centre stage in the 1970s, carbon dioxide emissions have now become the key topic. Intensive research has been being carried out for some years now to find ways in which the production of this gas can be avoided where possible or else ways in which this gas can be removed from the atmosphere. With regard to the latter option various methods have been proposed for binding the carbon dioxide from the atmosphere to solids or liquids and then storing it. Such methods are known, for example, from WO2005108297A, KR2005028624 A and WO2004098740 A. It has also been attempted to reduce the carbon dioxide electrochemically, in which case the electric energy can be obtained from solar energy in an environmentally friendly manner, as described in JP4063115 A.

However, these methods have the drawback that they either merely relocate the problem or else are very energy intensive.

OBJECT OF THE INVENTION

An object of the present invention is to provide a method which in particular removes $NO_x$ and carbon dioxide from waste gases.

GENERAL DESCRIPTION OF THE INVENTION

This object is achieved in accordance with the invention by a method for the catalytic removal of carbon dioxide and $NO_x$ from waste gases in a reactor charged with activated carbon catalyst. This method is characterised by the following steps:
a) saturating the catalyst with water
b) saturating or partially saturating the waste gases with water,
c) introducing the waste gases into the reactor,
d) catalytically converting $NO_x$ into $NO_2^-/NO_3^-$ and, in parallel with this, catalytically converting $CO_2$ into carbon and $O_2$ on the same catalyst,
e) washing out the activated carbon catalyst with water and discharging the carbon as a solid and $NO_2^-/NO_3^-$ dissolved in water.

One advantage of the method is that $NO_x$ and $CO_2$ are separated from the gas phase in the form of $NO_3^-$ and C and are present once the method is complete as a liquid ($NO_3^-$ dissolved in water) or as a solid and can be used further.

The method makes it possible to treat waste gases from industrial plants, in particular combustion waste gases, which contain carbon dioxide and $NO_x$ (e.g. from burning natural gas) and to remove both harmful substances at the same time and in parallel, i.e. in a single method, either completely or in part from the waste gases.

The catalyst should advantageously be saturated or partially saturated with $NO_x$ before it is first used.

The expression "saturation or partial saturation of the catalyst with $NO_x$" is understood in the context of the present invention to mean that the waste gases which subsequently reach the activated carbon catalyst have sufficient exothermic conversion energy, which results from the conversion of $NO_x$ into $NO_3^-$ subsequently to commence $CO_2$ conversion. This corresponds, as emerged from our tests, to an order of magnitude of 0.1-0.3 kg of $NO_x/m^3$ of activated carbon catalyst.

The expression "saturation of the catalyst with water" is understood in the context of the present invention to mean that the catalyst is exposed to water or water vapour until water runs out of the reactor. This corresponds, as emerged from the tests described here-below, to an order of magnitude of 250 to 550 kg of water/$m^3$ of activated carbon catalyst. It is also understood the saturation of the catalyst may be done with an aqueous solution containing a base and/or a surfactant.

In contrast to the method CN 101 564 640, here the method is performed with a "wet" catalyst. The catalyst is wet before the start of the reaction and is sprayed with water before and while the method is being performed and the resultant solids are washed off while the method is performed, i.e. without the method having to be broken off. In CN 101 564 640, on the other hand, the catalyst is operated "dry" and only after cleaning no longer functions effectively (step 5 of the method) is the method interrupted and the catalyst is sprayed with water in order to wash off the products adhering thereto, whereby a dilute, liquid acid with residues is obtained (step 6 of the method). Air heated to 100° C. to 120° C. is added to the reactor in step 7 of the method CN 101 564 640 in order to dry the catalyst before the reactor is brought back into operation. The gases to be treated in the method of CN 101 564 640 do also contain water vapour but only in a very low concentration (2-12% by volume).

A significant difference between the methods accordingly consists in the fact that the method in CN 101 564 640 has to be regularly interrupted to recycle the catalyst and the catalyst has to be dried after recycling by spraying with water. These method conditions obviously do not allow $CO_2$ to be converted into carbon in solid form, since after the catalyst has been washed off a dilute, liquid acid solution is obtained, which is purified on a membrane filter. Were carbon present as a solid in this solution, it would have been conspicuous, since the solution would have been black and the solid would have been obviously retained on the membrane filter.

In the method at least 30% by volume of the $CO_2$ contained in the waste gases is converted, preferably at least 50% by volume, particularly preferably at least 70% by volume and in particular at least 90% by volume. Furthermore, at least 20% by volume of the $NO_x$ content may be converted, preferably at least 50% by volume, particularly preferably at least 70% by volume and in particular at least 90% by volume may be degraded.

The term "$NO_x$" is understood in the context of the present invention to mean nitrogen oxides or nitrous gases as collective terms for the gaseous oxides of nitrogen. They are conventionally abbreviated to $NO_x$, since the many oxidation states of nitrogen result in a plurality of nitrogen-oxygen compounds.

The expression "saturation/partial saturation of the waste gases with water" is understood in the context of the present invention to mean that waste gases are saturated/partially saturated with water by means for example of a quencher/ washer. The waste gases are accordingly preferably saturated with water vapour to their dew point. The waste gases should, however, exhibit a relative humidity of at least 50%, preferably 60%, particularly preferably 80%.

According to a preferred configuration of the invention, the waste gases are passed prior to step b) into a prereactor containing a second catalyst and then saturated or partially saturated with water in step b).

According to a further preferred configuration of the invention, the waste gases are passed after step b) into a prereactor containing a second catalyst and then introduced into the reactor in step c).

The second catalyst in the prereactor is preferably used in the dry state, i.e. no water is fed to it and care is taken to ensure that no condensed water forms during the reaction. In cases where the waste gases are only introduced into the prereactor downstream of the quencher, care must be taken to ensure that the temperature of the gases does not fall below their dew point during their residence time in the prereactor.

The expression "washing out the catalyst with water" is understood in the context of the present invention to mean feeding water into the upper part of the reactor, the water then flowing through the reactor countercurrently to the gases. Alternatively, the water may also be added cocurrently to the gases.

After the reaction the carbon is discharged from the reactor as a solid by washing out the catalyst. It may be present both as C and as C compounds. The expression C compounds is understood in context of the present invention to mean C(NO) complexes and other compounds between C, N and O. The term "carbon" is accordingly understood in the context of the present invention to mean both carbon (C) and C compounds such as C(NO) complexes and other compounds between C, N and O.

Waste gases are preferably treated which contain between 100 and 1500 ppm of NO and between 0.3 and 15% by volume of $CO_2$. Of course it is also possible to treat waste gases in which the ratio of the two harmful substances lies outside this range. In such a case it may happen, however, that the harmful substance which lies above the aforementioned limit is not completely removed from the waste gases, but is removed only in part.

According to a preferred embodiment of the invention, however, $C_xH_y$ may also be removed from the waste gases, as additional harmful substances, at the same time as the $CO_2$ and $NO_x$, if $C_xH_y$ is contained in the waste gases.

The term "$C_xH_y$" is understood in the context of the present invention to mean compounds which consist only of carbon and hydrogen, such as for example straight-chain or branched alkanes, cycloalkanes, straight-chain or branched alkenes, straight-chain or branched alkynes and aromatics.

The content of $C_xH_y$ in the gases to be treated is preferably between 0 and 700 ppm of $C_xH_y$.

Below the above-stated limits there is marginal or no influence on the $NO_x$—$CO_2$ reaction. In the case where the additional harmful substances are above the above-stated limit, they are not removed completely from the waste gases, but rather only in part.

The inlet temperatures of the waste gases in the reactor preferably lie between ambient temperature and 150° C. Higher temperatures could permanently damage the catalyst.

The oxygen content of the waste gases is not actually critical, but it should ideally be at least 5% by volume, preferably at least 8% by volume, particularly preferably at least 10% by volume, and in particular at least 12% by volume.

The waste gases may be saturated quite easily with water by quenching or with a washer or a similar method.

The waste gases should naturally contain as little solids, dust and the like as possible in order to prevent poisoning and/or clogging of the catalyst. This dedusting of the waste gases is carried out by conventional filtering before the waste gases are then fed into the quencher or the washer.

The purifying factor of $CO_2$ is influenced by washing-out of the activated carbon bed. For example, in tests carried out with identical waste gas inlet parameters, $CO_2$ separation of roughly 50% is established in the case of washing out of the catalyst with water. In contrast, washing out the catalyst with a base, e.g. 5-30% NaOH solution, may result in $CO_2$ separation of over 90%.

The term "base" is understood in the context of the present invention to mean an aqueous solution of $M^{n+}(OH^-)_n$, wherein M is selected from the groups consisting of alkali metals and alkaline earth metals and wherein n is 1, 2 or 3. An aqueous NaOH solution is preferably used.

The concentration of the base is ideally of an order of magnitude of 5-30% by weight in water. The introduction of very fine water droplets with or without $M^{n+}OH^-)_n$ into the flue gas results in a lowering of the temperature and inter alia an increase in the water content with optionally a corresponding $M^{n+}OH^-)_n$ content up to a relative humidity of a maximum of 100% in the flue gas.

Washing out of the activated carbon bed may also be positively influenced by mixing ionic, non-ionic, amphoteric or anionic surfactants into the water or the base which is used to wash off the catalyst.

The term "surfactants" is understood in the context of the present invention to mean substances which reduce the surface tension of a liquid or the interfacial tension between two phases and allow or assist in the formation of dispersions or act as solubilisers.

BRIEF DESCRIPTION OF THE FIGURES

Further details and advantages of the invention can be taken from the following detailed description of a possible embodiment of the invention on the basis of accompanying FIGS. 1-10. In the drawings.

DESCRIPTION OF AN EMBODIMENT OF THE INVENTION

Test Arrangement 1

Figure 1:
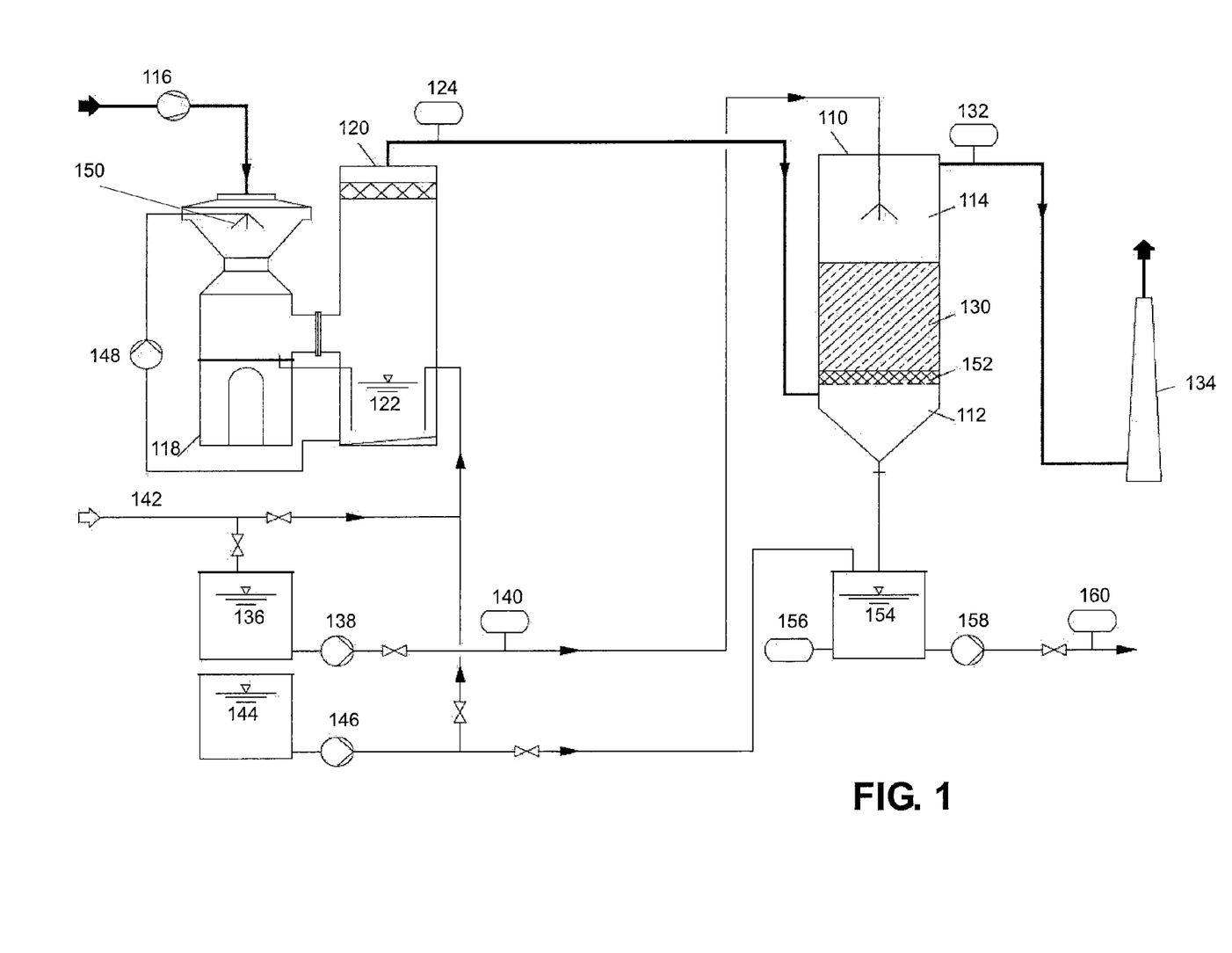
FIG. 1 is a schematic view of the first test arrangement.

The test arrangement 1 shown in FIG. 1 in order to illustrate the invention comprises a test reactor 110, to the lower part 112 of which a test gas is supplied and into the upper part 114 of which water or a base is sprayed.

The test waste gas originates from natural gas combustion. The waste gas is dedusted with the assistance of an electrostatic dust filter (not shown) and passes via a fan 116 at approx. 300° C. into a venturi quencher 118. The holding tank 122, incorporated into the mist collector 120, of the venturi quencher 118 was filled with water or a 15% NaOH solution. The waste gases are cooled and saturated to saturation temperature in the venturi quencher 118.

A first measuring device 124 analyses the composition ($NO_x$ content, $CO_2$ content, as well as $O_2$ content and in some tests $C_xH_y$ content), the temperature, the flow volume and the flow rate of the test waste gas.

The test gas then enters the reactor 110.

The reactor 110 was charged with an activated carbon catalyst 130.

The test gas flows through the reactor 110 and the catalyst 130 arranged therein from bottom to top and is examined once discharged from the test reactor 110 in a second measuring device 132 for the same parameters as in the first measuring device 124, i.e. composition ($NO_x$ content, $CO_2$ content, $O_2$ content and in some tests $C_xH_y$ content), the temperature, the flow volume and the flow rate, and is then released into the atmosphere through a stack 134.

On the activated carbon catalyst 130, which is not additionally impregnated with metals, the $NO_x$, $CO_2$ and optionally $C_xH_y$ is converted catalytically with ongoing addition of a base or water (washing off of the activated carbon bed).

The water or base required in the reactor 110 is fed from a storage container 136 by means of a pump 138 via a measuring device 140, where the flow rate is measured, into the upper part 114 of the reactor 110, where the water/base flows through the activated carbon catalyst 130 countercurrently to the test gas.

The water required for the quencher 118 comes directly from the water supply 142 and is circulated. If the quencher 118 is operated with a base, the base is delivered from the storage container 144 by means of a pump 146 into the holding tank 122 of the mist collector 120 of the quencher 118. The water located in the holding tank 122 of the mist collector 120 or the base is delivered by means of a pump 148 to the spray head 150 of the quencher 118.

The reactor 110 comprises a packing material 152, which is located under the activated carbon catalyst 130. This packing material 152 serves to distribute the gas and should consist of an inert material such as for example $Al_2O_3$. This packing material ensures that the gases are distributed over the entire catalyst.

The $NO_3^-$ and carbon or carbon compounds formed on the catalyst 130 by the reactions are rinsed off the catalyst 130 by spraying with water or a base, as a function of the volume of the activated carbon catalyst 130 and the NO and $CO_2$ concentrations and additionally, if present, $C_xH_y$ concentrations, countercurrently to the gas.

In the case of the pilot system, the activated carbon catalyst 130 is continuously rinsed with a water/base quantity of 5-20 l/min. The quantity of water/base which is used up depends on the concentrations of harmful substances. If insufficient is washed off, given the concentrations of harmful substances arising, the pores of the activated carbon catalyst 130 may clog and the entire reactions may come to a standstill.

The process water is collected in a container 154 in the lower part 112 of the reactor 110 optionally together with the base and the carbon or carbon compounds produced during the process and suspended in said process water, and the pH is determined by means of a measuring device 156. The liquid is then pumped off by a pump 158 and the flow volume is ascertained using a further measuring device 160.

In the system described the $NO_x$ of the waste gases is catalytically converted on moist activated carbon catalyst particles to form $NO_3^-$, and carbon dioxide is cleaved at the same time or in parallel to form carbon and oxygen or, if it is present, $C_xH_y$ is converted into carbon and $H_2$. However, some of the carbon may also be present as carbon compounds.

The tests were carried out under the following conditions:
raw gas volume flow: 150 m³/h min. up to max. 250 m³/h,
  $NO_x$ content of the flue gases between 100 ppm and 1000 ppm
  $CO_2$ content of the flue gases between 0% by volume and 6% by volume
  Gas temperature on entry into reactor between 15 and 80° C.
  $O_2$ content of flue gases between 10-18% by volume
  Water saturation and cooling of waste gases in the reactor by quenching with water or 5-30% NaOH solution
  Waste gas temperature (outlet): min. 30° C. to max. 45° C.
  Dew-point temperature, saturated.
  Tested activated carbon catalysts were provided by NORIT Nederland B.V. of Postbus 105 NL-3800 AC Amersfoot under the names Norit_PK1-3, Norit_PK_2-4 and Norit_PK_3-5.

These activated carbon catalysts are an activated carbon granulate with a particle size of 1-3 mm, 2-4 mm or 3-5 mm, which were produced by steam activation. The following general properties are guaranteed by the manufacturer: iodine number 800; methylene blue adsorption 11 g/100 g; inner surface area (BET) 875 m²/g; bulk density 260 kg/m³; density after back-wash 230 kg/m³; uniformity factor 1.3—ash content 7% by weight; pH alkaline; moisture (packed) 2% by weight.

In the tests flue gas analysis devices of the Testo brand were used. The devices are of a recent generation (year of manufacture 2009) and were checked and calibrated by the manufacturer before the tests were carried out.

$NO_x$ conversion on the catalyst surface proceeds in formal terms, in accordance with current knowledge, according to the following empirical formulae:

Oxidation $$2NO + O_2 \rightarrow 2NO_2$$

$$2NO_2 \rightarrow N_2O_4$$

$$NO + NO_2 \rightarrow N_2O_3$$

Production of Nitric Acid Through Addition of Water $$3NO_2 + H_2O \rightarrow 2HNO_3 + NO$$

$$N_2O_4 + H_2O \rightarrow HNO_3 + HNO_2$$

$$3N_2O_4 + 2H_2O \rightarrow 4HNO_3 + 2NO$$

$$N_2O_3 + H_2O \rightarrow 2HNO_2$$

$$3HNO_2 \rightarrow HNO_3 + 2NO + H_2O$$

Neutralisation by a Base $$N_2O_4 + 2NaOH \rightarrow NaNO_3 + NaNO_2 + H_2O$$

$$NO + NO_2 + 2NaOH \rightarrow 2NaNO_2 + H_2O$$

$$N_2O_3 + 2NaOH \rightarrow 2NaNO_2 + H_2O$$

If present: the $C_xH_y$ reaction proceeds after C and $H_2$ on the catalyst surface. The C may here also be temporarily absorbed onto the activated carbon and/or C compounds and/or other compounds.

Without wanting to be committed to a particular theory, it is assumed that:

- $NO_x$ and $O_2$ migrate to the active centres of the catalyst. $NO_x$ is here partially oxidised to $NO_2$ as well as $N_2O_3$ and $N_2O_4$.
- $NO_2$ then migrates out from the active centres of the catalyst and reacts with NaOH, if present, on the aqueous shell around the catalyst core to yield $NO_2^-$, $NO_3^-$ and $H_2O$.
- The $CO_2$ molecule is also transported into the pores of the catalyst core, where it is separated by the addition of energies of formation or adsorbed on C compounds. The NaOH solution, if present, which is located in the aqueous shell around the core adsorbs the C portion of $CO_2$ and $O_2$ through high surface tensions (specific surface area). 'Carbon compounds' are likewise produced
- The C part located on a carbon compound is present within the water or with the base as a suspension.
- The formed C and/or the formed carbon compounds are discharged in a suspension with water or the base from the catalyst by washing with water or base. The formed C and/or the formed carbon compounds precipitate after a short period of time.

Softened or demineralised water, with or without the addition of base (e.g. NaOH), was used to wash the catalyst.

It is assumed, without wanting to be committed to a particular theory, that the $CO_2$ is adsorbed using the exothermic energy which is produced by the oxidation/neutralisation of $NO_x$ to form $NO_3^-$ and/or $NO_2^-$.

In the tests performed, the reactor is made of glass fibre reinforced plastics material, has a volume of approximately 2 $m^3$ and is filled with 2 $m^3$ of an activated carbon catalyst of the Norit_PK_2-4 type.

Figure 2:
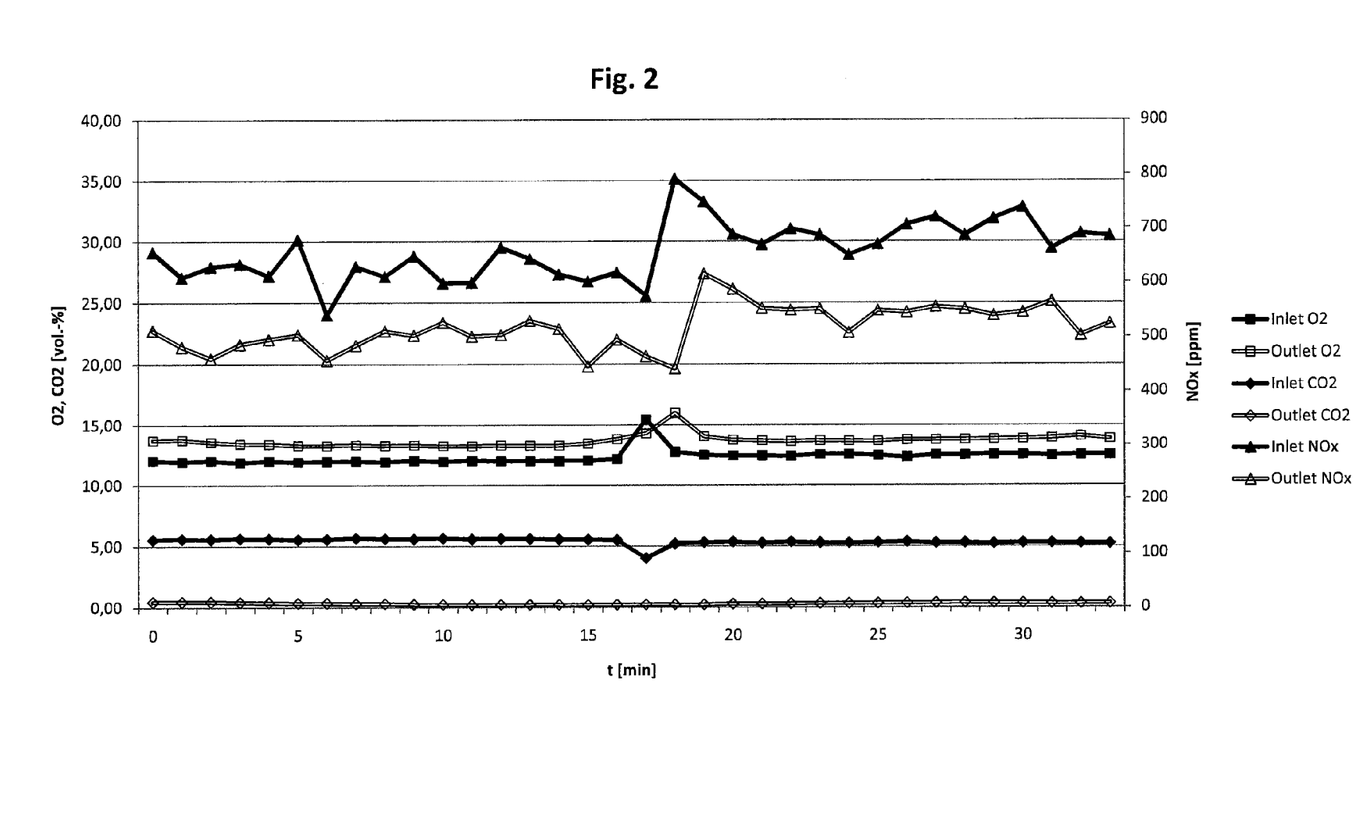
FIG. 2 is a graph showing the values measured in the first test arrangement of the $CO_2$, $NO_x$ and $O_2$ contents of the waste gases at the inlet or outlet of the reactor, the catalyst having been washed out with NaOH.

In a first phase the test system was run at a throughput of approx. 220 $m^3$/h with the addition of between 500 and 800 ppm of $NO_x$. Overall, the reactor was charged with approximately 8 kg of $NO_x$ (approximately 4 of $NO_x/m^3$ of activated carbon catalyst (FIG. 2).

Figure 3:
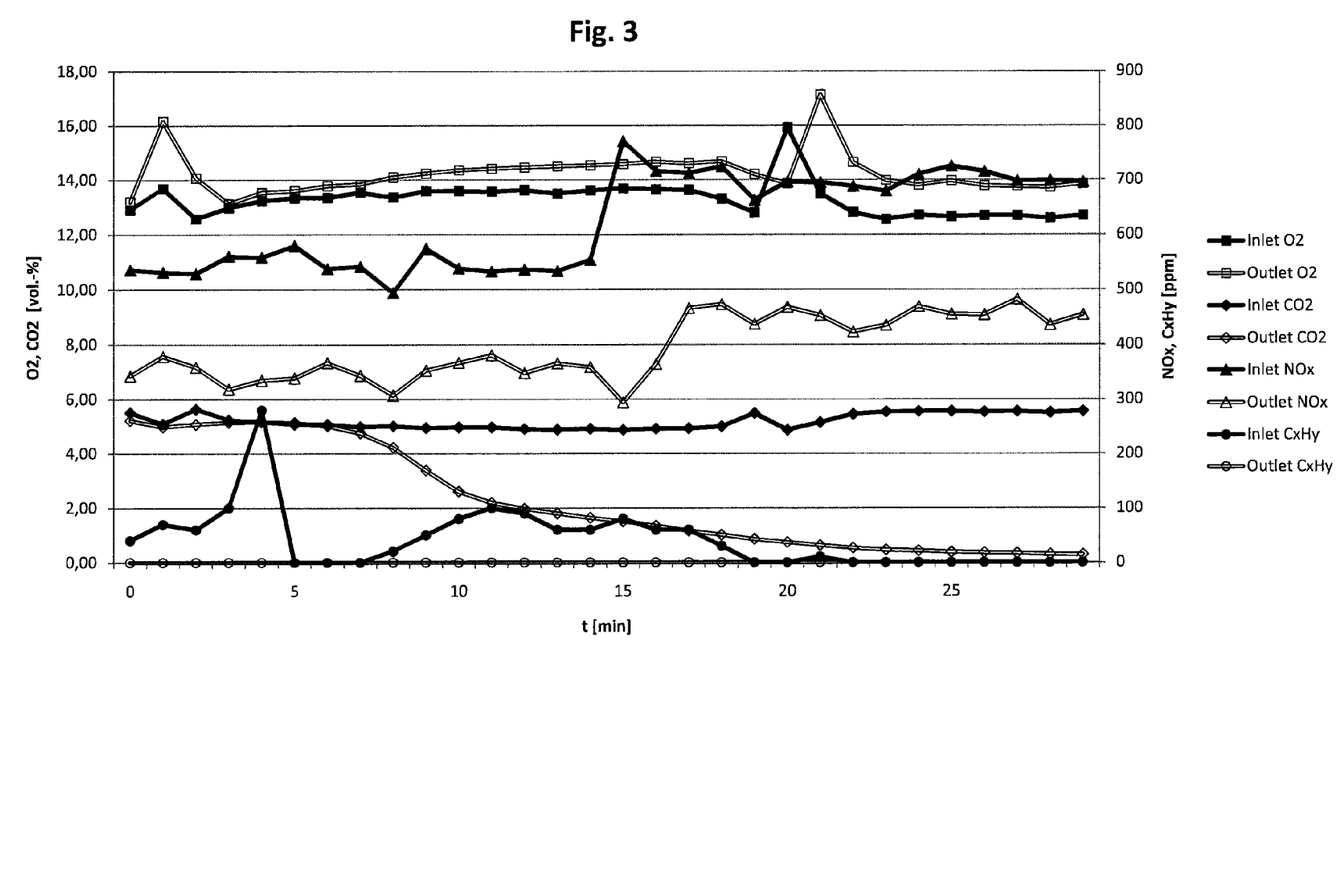
FIG. 3 is a graph showing the values measured in the first test arrangement of the $CO_2$, $NO_x$, $C_xH_y$ and $O_2$ contents of the waste gases at the inlet or outlet of the reactor, the catalyst having been washed out with NaOH.

According to this test, the waste gases were cooled from approx. 300° C. to approx. 60° C. in a quencher, which was charged with a 15% NaOH base solution. In this instance, the waste gas was saturated, i.e. the waste gas had a relative humidity of roughly 100%. According to the tests (see FIGS. 2 and 3) the ongoing addition of washing water consisting of a 5-30% NaOH solution onto the activated carbon catalyst proceeded at up to 10 l/min. The $NO_x$ and $CO_2$ contents of the waste gases were measured in each case at the inlet and at the outlet of the reactor, as illustrated in FIG. 1. The measurements were taken every 60 seconds and were shown in graphs in FIGS. 2 and 3. The measurements shown in FIG. 2 proceeded after saturation of the catalyst with $NO_x$. The $CO_2$ concentration was between 4.8% by volume and 5.6% by volume. In the tests (see FIG. 3) it was established that after approx. 5 minutes purification of $CO_2$ was proceeding, the purifying values of $CO_2$ then rising continuously up to 99.5%, irrespective of the increase or decrease in $CO_2$ values in the waste gas. The test was carried out continuously over approximately 60 minutes. Over this entire period the treated waste gases displayed a reduction of $NO_x$ of approx. 30-40%, as can be seen from FIG. 2. In the tests as illustrated in FIG. 3, $C_xH_y$ was also contained in the waste gas and was 100% separated.

In these tests (cf. FIG. 5a) it was found that the reduction of the $CO_2$ concentration, i.e. the breakdown of $CO_2$ in the reactor, is in a linear relation of the formula $y = -0.0314x + 10.113$ whereby the coefficient of determination R2 is 0.9442 to the reduction of the NOx concentration i.e. the breakdown of NOx in the reactor, both values being expressed in % volume.

In these tests an increase in the $O_2$ content between input measurements and output measures was identified. The increase in $O_2$ content is largely parallel to the reduction in the $CO_2$ content.

The washing water discharged from the reactor was entirely deep black in colour in all the tests.

Both neutralising salts and carbon/carbon compounds could be detected in the washing water. Investigations by an independent laboratory have established that the carbon/carbon compounds are a different carbon from that in the activated carbon catalyst. Test with radioactively marked CO2 test gas showed that the carbon contained in the wash water originates from the CO2 and does not come from the catalyst.

The neutralising salts and the carbon/carbon compounds settled out after a short period of time.

Figure 4:
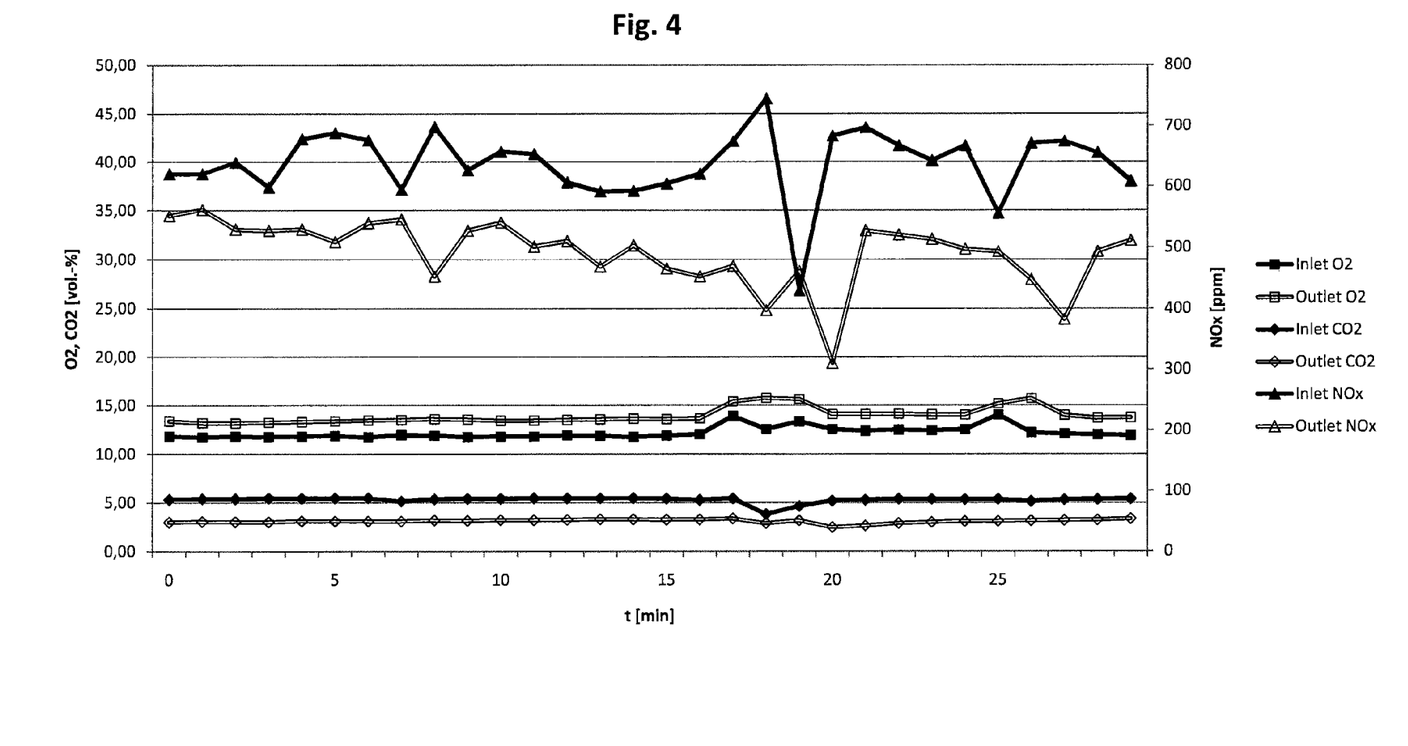
FIG. 4 is a graph showing the values measured in the first test arrangement of the $CO_2$, $NO_x$ and $O_2$ contents of the waste gases at the inlet or outlet of the reactor, the catalyst having been washed out with water.
Figure 5:
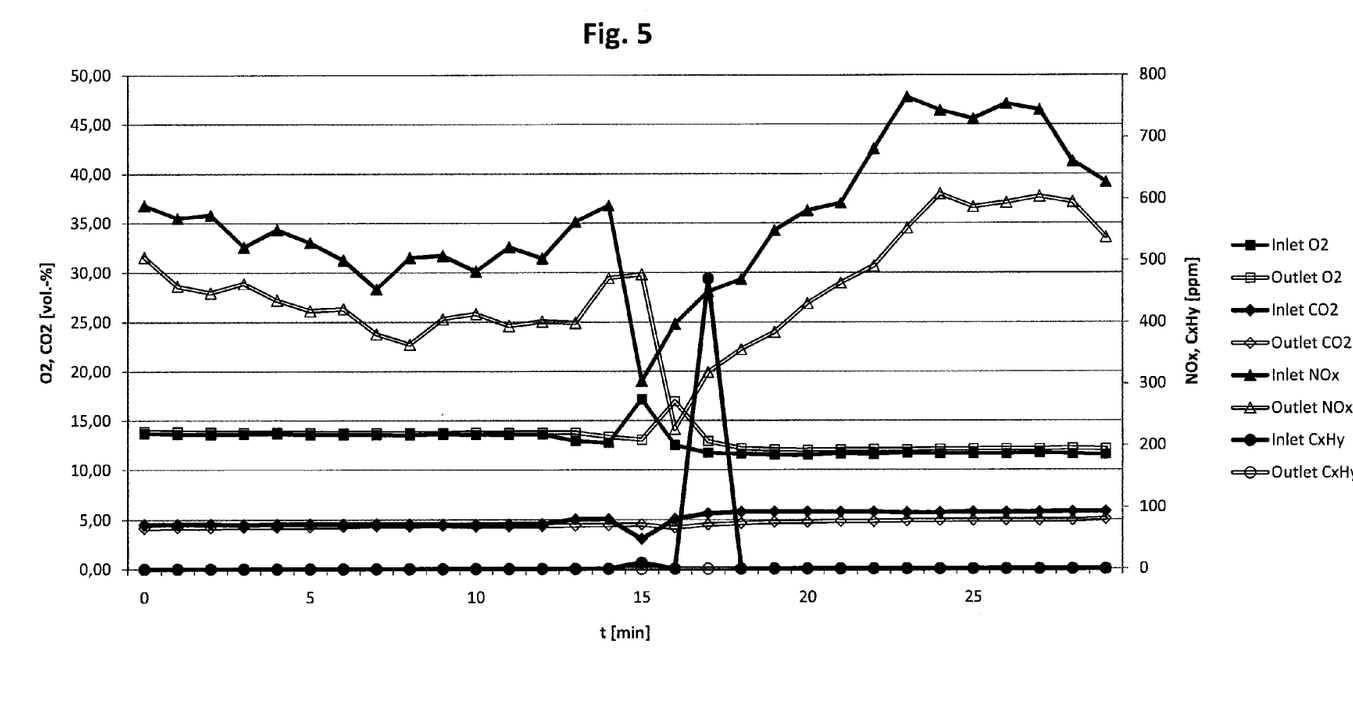
FIG. 5 is a graph showing the values measured in the first test arrangement of the $CO_2$, $NO_x$, $C_xH_y$ and $O_2$ contents of the waste gases at the inlet or outlet of the reactor, the catalyst having been washed out with water.
Figure 5A:
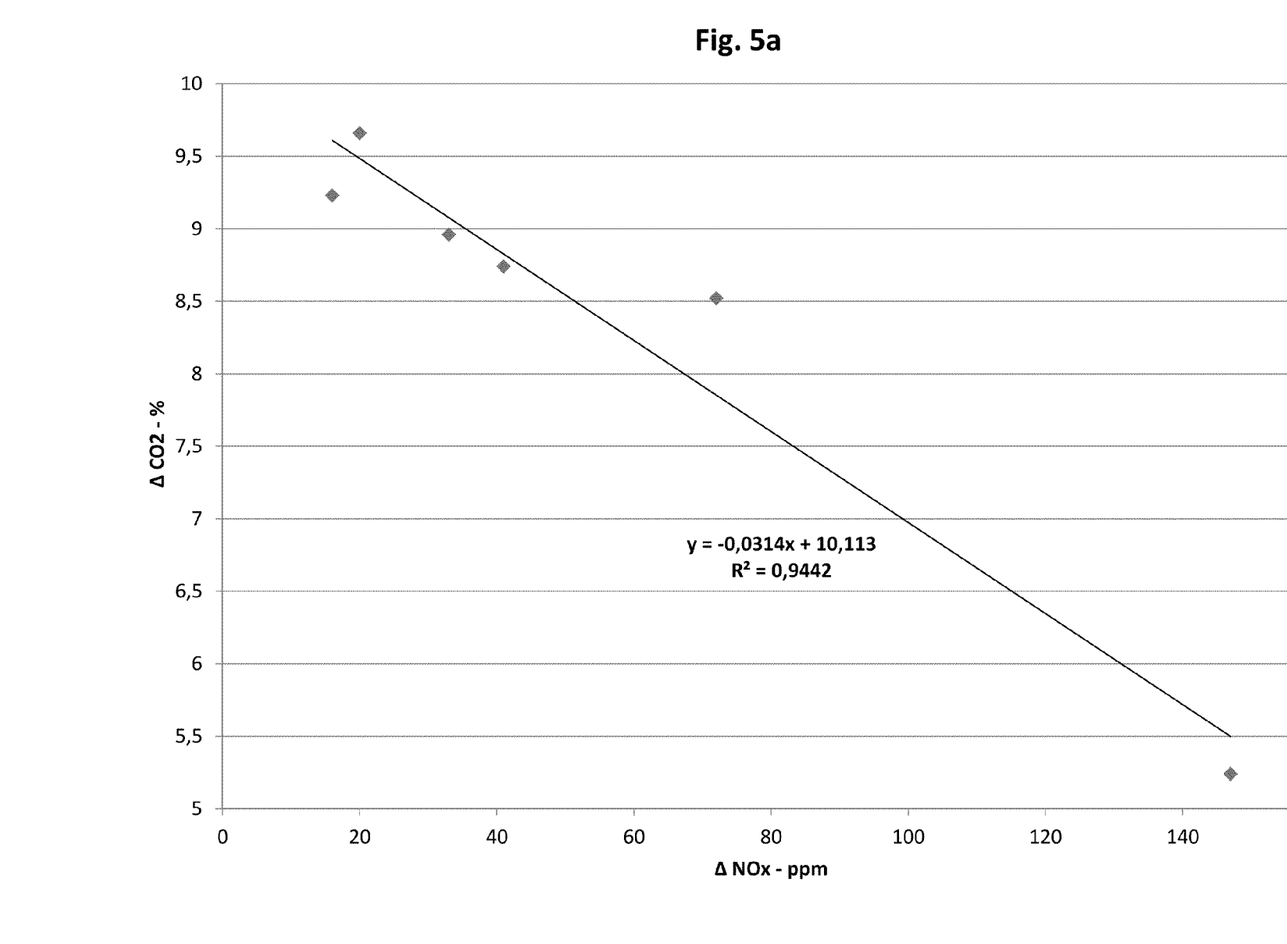
FIG. 5a is a graph showing the mean values of several experiments measured in the first test arrangement of the $CO_2$ and $NO_x$ contents of the waste gases at the inlet or outlet of the reactor, the catalyst having been washed out with NaOH.

For the series of tests illustrated in FIGS. 4 and 5 water was used, instead of NaOH, to saturate the waste gases and to wash out the catalyst. Here too it has been established that $NO_x$ and $CO_2$ (FIG. 4) or $NO_x$, $CO_2$ and $C_xH_y$ (FIG. 5) were removed from the waste gases. It has also been established that $CO_2$ conversion was not as efficient in the instances where water was used instead of base. In these tests too an increase in the $O_2$ content between input measurements and output measures was identified.

The four test results shown in the graphs prove that both $NO_x$ and $CO_2$ or $C_xH_y$ were degraded. The tests have likewise shown that the $O_2$ content increases.

The tests (see FIG. 3) which were carried out in the context of this invention have demonstrated that a certain degree of saturation of the activated carbon catalyst with $NO_x$ must be present before $CO_2$ separation starts.

Test Series 2

Figure 6:
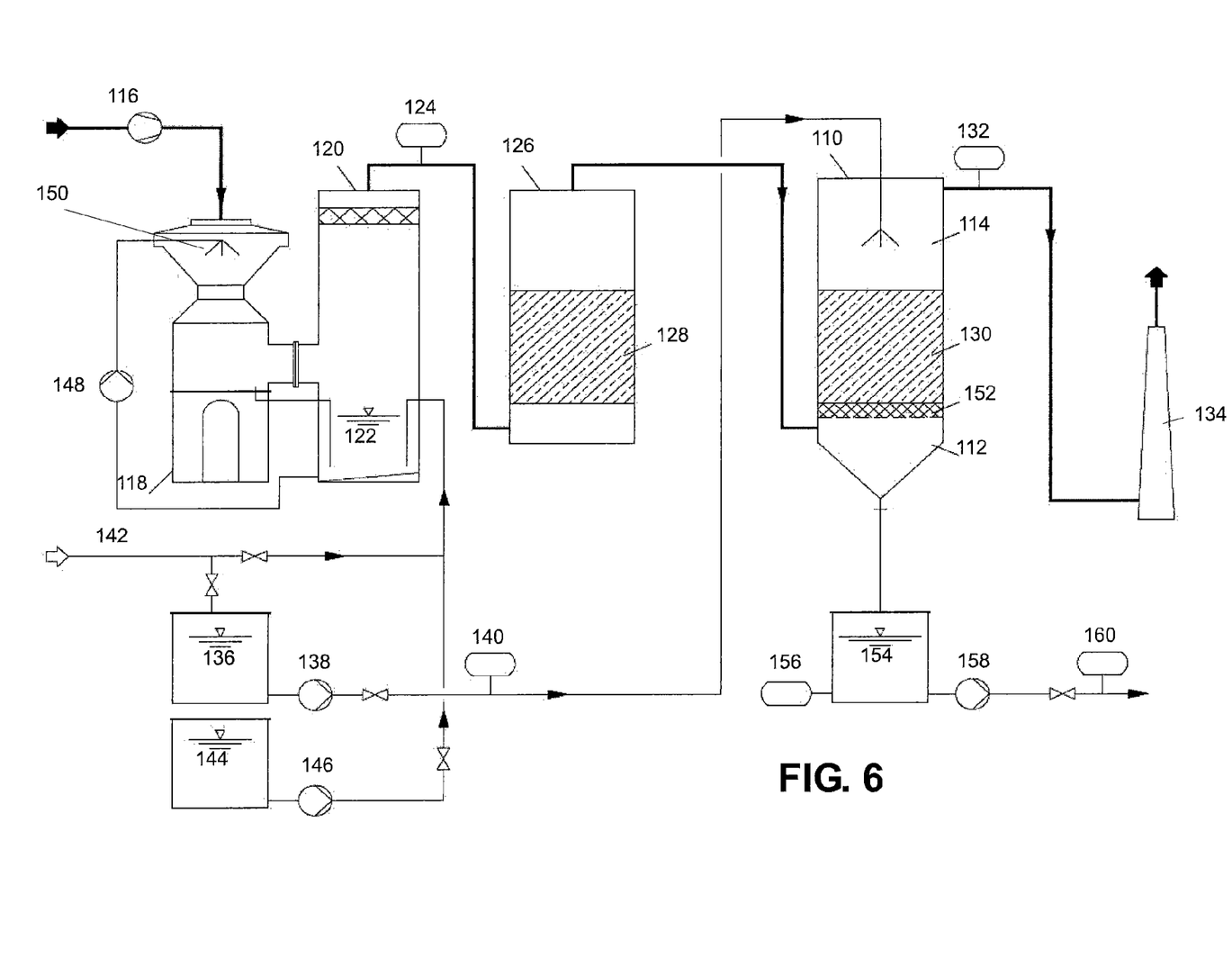
FIG. 6 is a schematic view of the second test arrangement.

The second test arrangement shown in FIG. 6 in order to illustrate the invention differs from the first test arrangement in that the test gas is firstly charged into a prereactor 126 by the quencher 118, said prereactor being charged with a catalyst 128 and then passed into the reactor 110.

This catalyst 128 of the prereactor 126 is an activated carbon catalyst from NORIT Nederland B.V. of Postbus 105 NL-3800 AC Amersfoot, made available under the name Norit_RST-3. This activated carbon catalyst is an extruded activated carbon granulate with a particle size of 3 mm. The following general properties are guaranteed by the manufacturer: butane adsorption at p/p0=0.1: 24 g/100 g; inner surface area (BET) 1200 m$^2$/g; bulk density 400 kg/m$^3$; hardness (ball-pan hardness): 98, moisture (packed) 5% by weight, decomposition time max.: 15 min, min.: 8 min.

The main difference between the two test arrangements consists, as stated, in the fact that in the second test arrangement a prereactor 126 is used. This prereactor 126 is exposed to the waste gases from the quencher 118 without the addition of water or base. The catalyst 128 in the prereactor 126 accordingly operates in principle "dry" while the catalyst in the first reactor 110 operates "wet". The catalyst 128 in the prereactor 126 remains "dry"; since the temperature of the waste gases varies only insignificantly in this prereactor, there is also no or only insignificant condensation of the water vapour contained in the waste gases.

However, it is also possible and perhaps simpler to cool the test gas down (with a heat exchanger for example) and then to convey it into the prereactor 126. The gas is then conveyed into the quencher 118 and then from there into the reactor 110.

Figure 7:
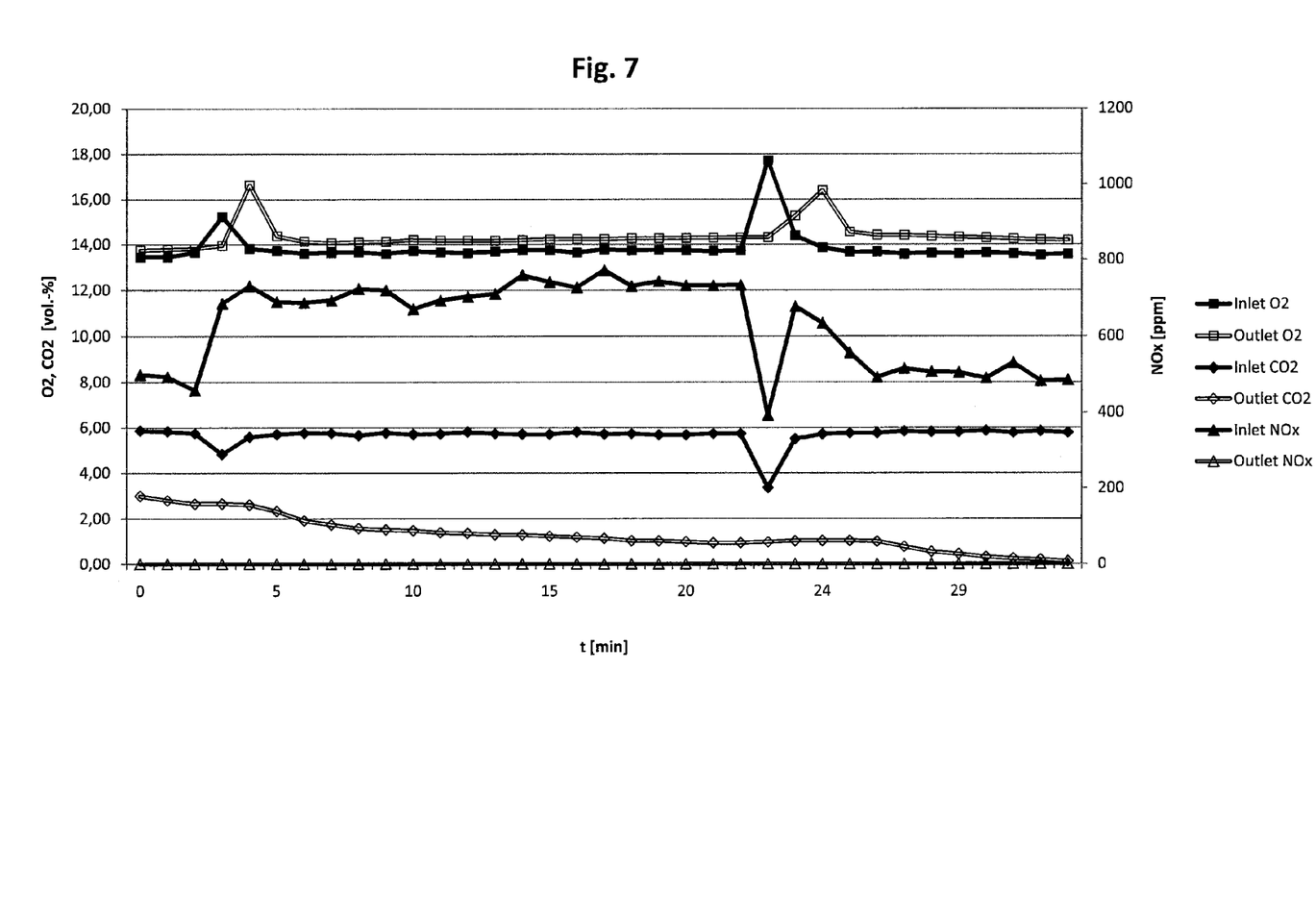
FIG. 7 is a graph showing the values measured in the second test arrangement of the $CO_2$, $NO_x$ and $O_2$ contents of the waste gases at the inlet of the prereactor or the outlet of the reactor, the catalyst in the second reactor having been washed out with NaOH.
Figure 8:
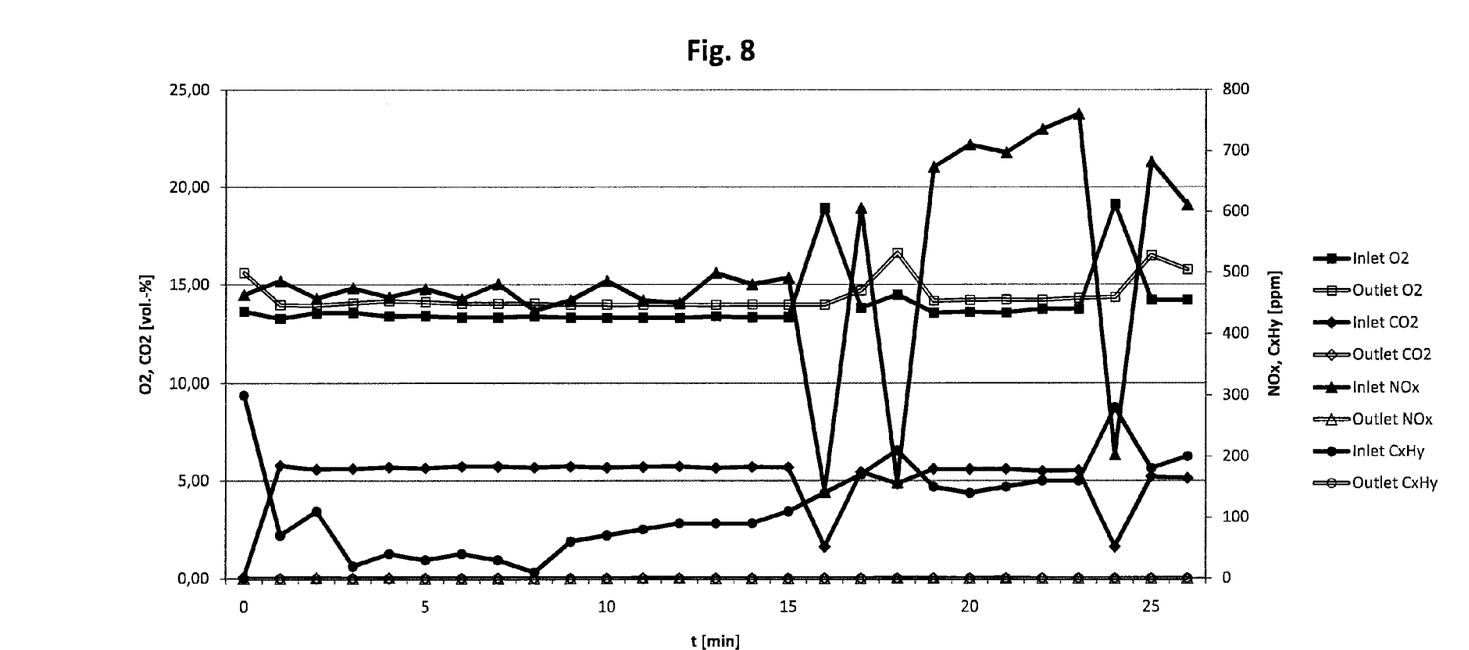
FIG. 8 is a graph showing the values measured in the second test arrangement of the $CO_2$, $NO_x$, $C_xH_y$ and $O_2$ contents of the waste gases at the inlet of the prereactor or the outlet of the reactor, the catalyst in the second reactor having been washed out with NaOH.

The results shown in FIGS. 7 and 8 originate from tests in which only water was used in the quencher and in each case a 5% NaOH solution was used in the reactor.

Figure 9:
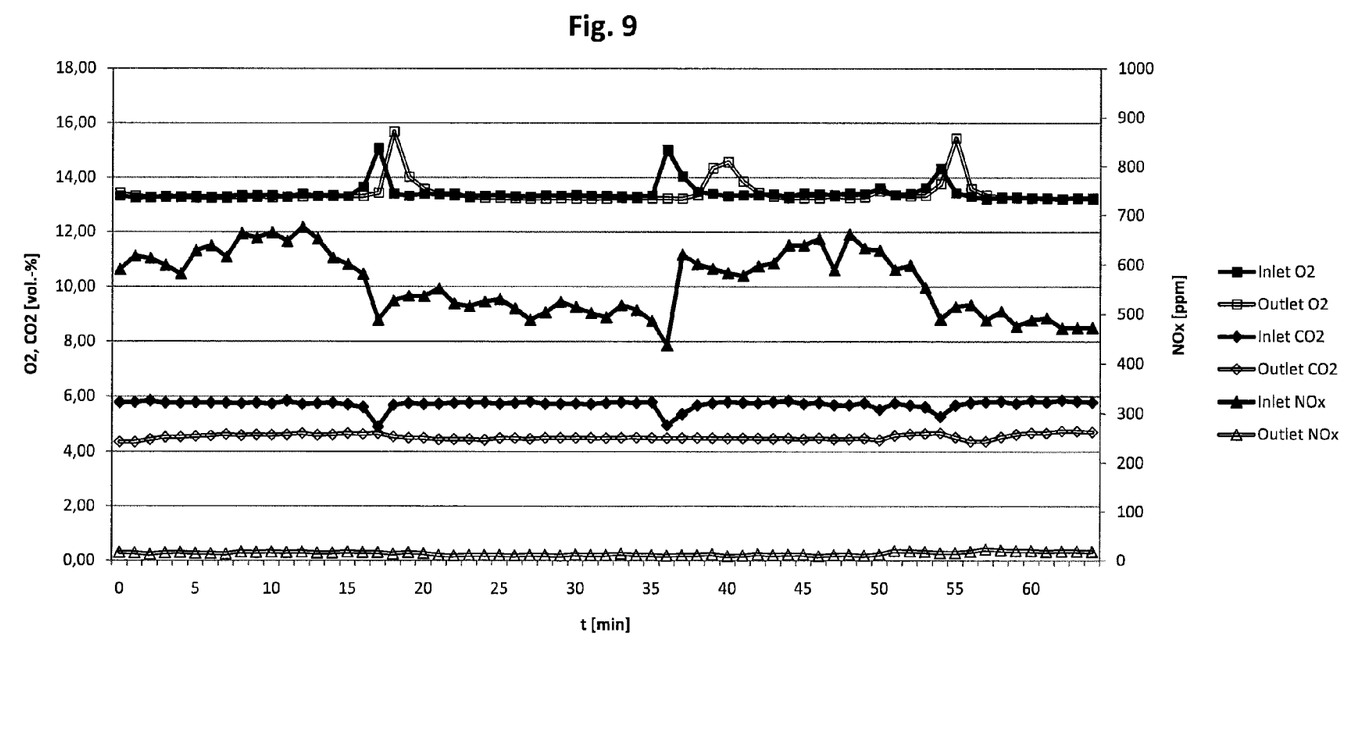
FIG. 9 is a graph showing the values measured in the second test arrangement of the $CO_2$, $NO_x$ and $O_2$ as well as $C_xH_y$ contents of the waste gases at the inlet of the prereactor or the outlet of the reactor, the catalyst in the second reactor having been washed out with water.
Figure 10:
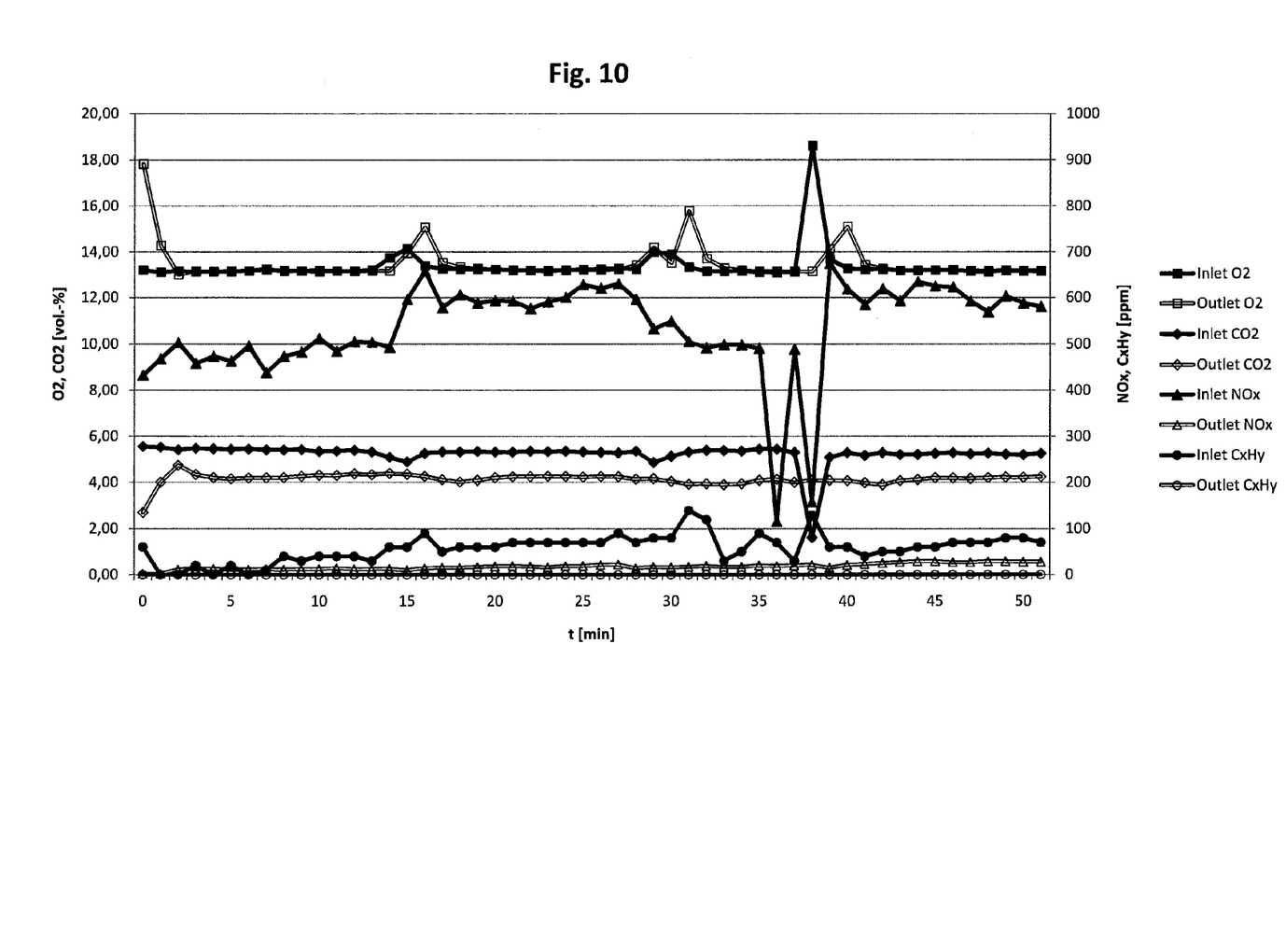
FIG. 10 is a graph showing the values measured in the second test arrangement of the $CO_2$, $NO_x$, $C_xH_y$ and $O_2$ contents of the waste gases at the inlet of the prereactor or the outlet of the reactor, the catalyst in the second reactor having been washed out with water.

The results shown in FIGS. 9 and 10 originate from tests in which in each case only water was used in the quencher and in the reactor.

In the tests from FIGS. 7 and 9 no $C_xH_y$ was contained in the waste gases. In FIGS. 8 and 10 waste gases were used which contained between 10 and 300 ppm of $C_xH_y$.

As is apparent from FIGS. 7-10, $NO_x$ underwent up to 100% degradation. Only in the tests shown in FIG. 10 did a few ppm of $NO_x$ remain in the waste gases. In all the other tests the $NO_x$ in the treated waste gases was equal to 0.

The tests from FIG. 8 show that $CO_2$ and $C_xH_y$ were also fully degraded. It is apparent from FIG. 7 that $CO_2$ falls continuously after a few minutes and tends towards zero towards the end of the test.

The results of FIGS. 9 and 10 show that, when only water is used, the degradation of $NO_x$ and of $C_xH_y$ is virtually complete, whereas the degradation of $CO_2$ proceeds to just 20-30%.

Figure 11:
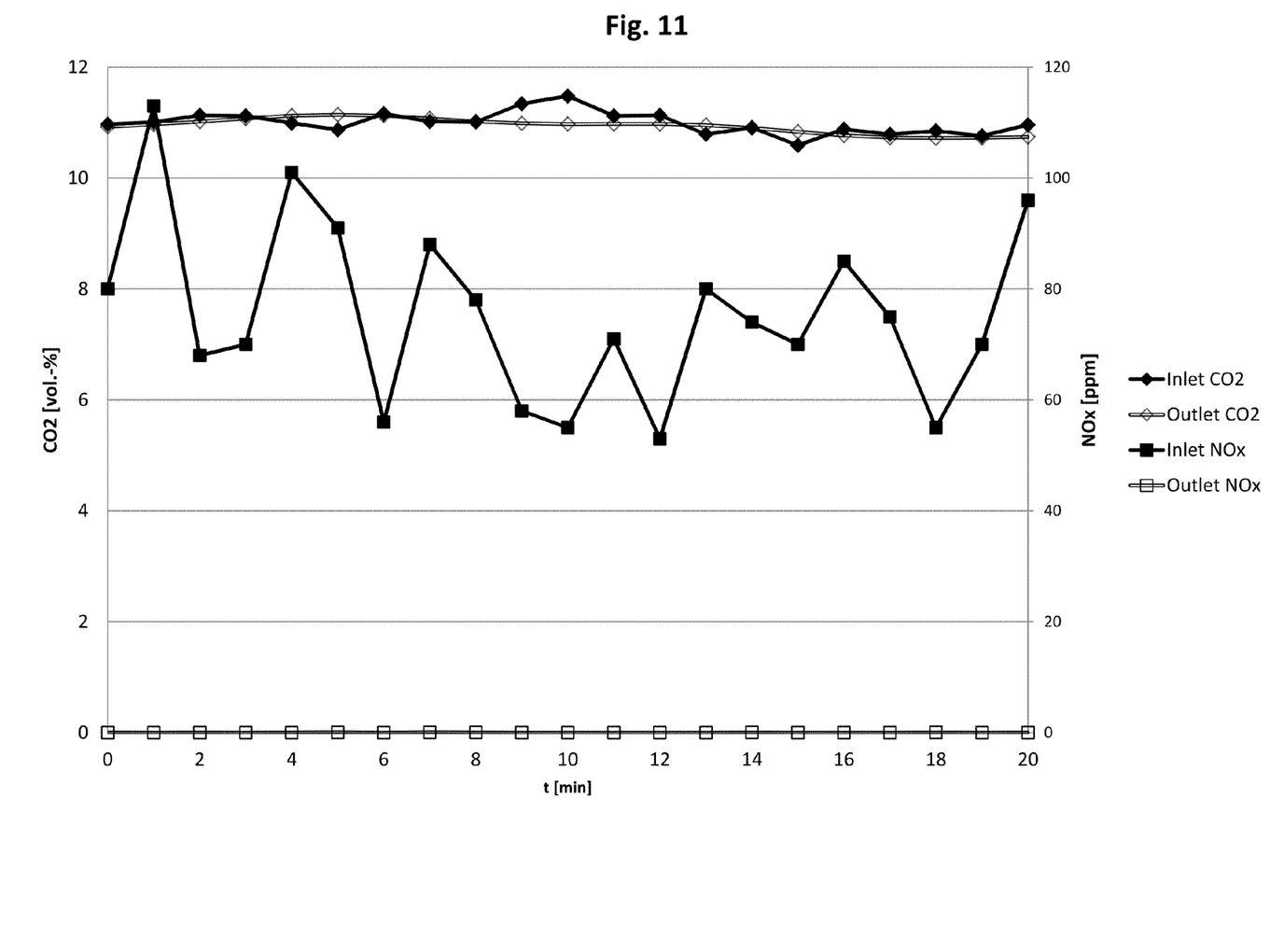
FIG. 11 is a graph showing the values measured in the second test arrangement of the $CO_2$ and $NO_x$ contents of the waste gases at the inlet of the prereactor or the outlet of the prereactor.

The results of FIG. 11 show that, in the prereactor 126 that operates under dry conditions, NOx is completely converted whereas CO2 is not converted at all. This prereactor corresponds to the reactor of CN 101 564 640 and it was found that on the activated carbon catalyst in the prereactor operated under dry conditions no CO2 was broken down. It is therefore obvious that in the method as disclosed in CN 101 564 640 no CO2 is broken down either. A break down of CO2 happens, as was shown in the tests, only on a "wet" catalyst, i.e. on a catalyst which has been soaked in water or in a watery solution.

The reaction which takes place on a "wet" catalyst is hence a reaction which differs from the reaction which takes place on the catalyst of CN 101 564 640 since that catalyst operates under different conditions.

The comparison between the tests with one reactor and the tests with two reactors shows that degradation of the harmful substances is virtually complete when using two reactors and when using a base to wash off the activated carbon catalyst in the second reactor. In the other configurations the contents of harmful substances may be markedly reduced.

From tests in a sewage sludge incinerator with typical flue gas values of approx. 10-12 percent $CO_2$, approx. 8 to 10 percent $O_2$ and approx. 50 to 200 ppm $NO_x$, it was possible to confirm the following characteristics for conversion of $NO_x$ and with parallel conversion of $CO_2$.

For the above-stated flue gas composition it was established that at less than roughly 50 ppm $NO_x$, $CO_2$ separation drops and above this value $CO_2$ separation rises. At the same time, it was confirmed that at these concentrations roughly 100 percent of the $NO_x$ input is converted and $NO_x$ output is thus virtually zero. At much higher values $NO_x$ is no longer fully converted and the reactor output $NO_x$ concentration increases. This top threshold value from which $NO_x$ was no longer fully converted (being required for $CO_2$ separation) was approx. 75 ppm in the above-stated test.

At extremely high $NO_x$ concentrations proportional to the input concentration of $CO_2$, $CO_2$ separation comes to a complete standstill or is severely reduced.

At such $NO_x$ concentration values it has been demonstrated that it is advisable to subject the waste gases to pretreatment in a reactor with a dry activated carbon.

The above-stated tests were confirmed by an international independent laboratory. A carbon balance confirmed the conversion of $CO_2$ into C and $O_2$.

| Key to drawings: | |
| --- | --- |
| 110 | Reactor |
| 112 | Lower part |
| 114 | Upper part |
| 116 | Fan |
| 118 | Quencher |
| 120 | Mist collector |
| 122 | Holding tank |
| 124 | Measuring device |
| 126 | Prereactor |
| 128 | Prereactor catalyst |
| 130 | Reactor catalyst |
| 132 | Measuring device |
| 134 | Stack |
| 136 | Storage container |
| 138 | Pump |
| 140 | Measuring device |
| 142 | Water supply |
| 144 | Storage container |
| 146 | Pump |
| 148 | Pump |
| 150 | Spray head |
| 152 | Packing material |
| 154 | Container |
| 156 | Measuring device |
| 158 | Pump |
| 160 | Measuring device |

The invention claimed is:

1. A method for catalytic removal of carbon dioxide and $NO_x$ from waste gases in a reactor charged with an activated carbon catalyst, said method comprising the following steps:
   a. first, saturating the activated carbon catalyst with water inside the reactor;
   b. next, saturating or partially saturating the activated carbon catalyst with $NO_x$ by 1.0 to 0.3 kg $NO_x$/m$^3$ of the activated carbon catalyst inside the reactor;
   c. saturating or partially saturating the waste gases with water and next introducing the waste gases into the reactor;
   d. simultaneously, catalytically converting $NO_x$ into $NO_2^-$/$NO_3^-$ and catalytically converting $CO_2$ into carbon and $O_2$ on the activated carbon catalyst;
   e. continually washing out the activated carbon catalyst with water; and
   f. discharging solid carbon and dissolved $NO_2^-$/$NO_3^-$.

2. The method according to claim 1, further comprising catalytically converting and removing $C_xH_y$ from the waste gases at the same time as the $CO_2$ and $NO_x$ are removed.

3. The method according to claim 1, wherein the activated carbon catalyst is an activated carbon granulate produced by steam activation having a particle size selected from the group consisting of 1-3 mm, 2-4 mm and 3-5 mm, iodine number 800; methylene blue adsorption 11 g/100 g; inner surface area (BET) 875 $m^2$/g; bulk density 260 kg/$m^3$; density after back-wash 230 kg/$m^3$ uniformity factor 1.3—ash content 7% by weight; pH alkaline; and moisture (packed) 2% by weight.

4. The method according to claim 1, further comprising passing the waste gases into a prereactor containing a second catalyst prior to saturating or partially saturating the waste gases with water and prior to introducing the waste gases into the reactor.

5. The method according to claim 4, wherein the second catalyst is an extruded activated carbon granulate with a particle size of 3 mm; butane absorption at p/p0=0.1: 24 g/100 g; inner surface area (BET) 1200 $m^2$/g; bulk density 400 kg/$m^3$; hardness (ball-pan hardness): 98; moisture (packed) 5% by weight; and decomposition time max.: 15 min, min.: 8 min.

6. The method according to claim 4, wherein the second catalyst is used in the dry state in the prereactor.

7. The method according to claim 1, wherein an additive selected from the group consisting of a base $M^{n+}(OH^-)_n$, a surfactant and mixtures thereof is added to one or more of the water saturating the catalyst, the water saturating or partially saturating the waste gases and the water washing out the activated carbon catalyst;

wherein $M^{n+}(OH^-)_n$, M is selected from the groups consisting of alkali metals and alkaline earth metals and n is 1, 2 or 3: and wherein the surfactant is at least one selected from the group consisting of ionic surfactants, anionic surfactants, amphoteric surfactants, and nonionic surfactant.

8. The method according to claim 1, wherein the waste gases contain between 100 and 1500 ppm of $NO_x$ and between 0.3 and 15% by volume of $CO_2$.

9. The method according to claim 1, wherein the waste gases contain between 0 and 700 ppm of $C_xH_y$.

10. The method according to claim 1, wherein the oxygen content of the waste gases is at least 5% by volume.

11. The method according to claim 1, further comprising the step of discharging $O_2$.

* * * * *